(12) United States Patent
Burnot et al.

(10) Patent No.: US 11,885,156 B2
(45) Date of Patent: Jan. 30, 2024

(54) LOCKING DEVICE FOR AN ELECTRICAL SWITCHBOARD

(71) Applicant: Schneider Electric Industries SAS, Rueil Malmaison (FR)

(72) Inventors: Claude Burnot, Echirolles (FR); Bernard Lebeau, Les Adrets (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 77 days.

(21) Appl. No.: 17/569,582

(22) Filed: Jan. 6, 2022

(65) Prior Publication Data

US 2022/0220777 A1 Jul. 14, 2022

(30) Foreign Application Priority Data

Jan. 8, 2021 (FR) ...................................... 2100171

(51) Int. Cl.
*E05B 65/00* (2006.01)
*H02B 1/04* (2006.01)
*E05B 15/00* (2006.01)

(52) U.S. Cl.
CPC ............... *E05B 15/00* (2013.01); *H02B 1/04* (2013.01)

(58) Field of Classification Search
CPC . H02B 1/052; H02B 1/04; H01H 9/26; H01H 9/265; H01H 9/281–282; E05B 65/00
See application file for complete search history.

(56) References Cited

U.S. PATENT DOCUMENTS

| 2,557,351 | A | * | 6/1951 | Jacobson | ................. H01H 9/26 200/5 E |
| 2,748,204 | A | * | 5/1956 | Woods | ..................... B61L 19/16 200/245 |
| 3,179,759 | A | * | 4/1965 | Rice | ....................... H01H 9/282 200/43.14 |
| 3,492,448 | A | | 1/1970 | Phillips, Jr. | |
| 3,674,948 | A | * | 7/1972 | Betlejewski | ........... H01H 13/72 200/5 B |

(Continued)

FOREIGN PATENT DOCUMENTS

| CN | 2870119 Y | 2/2007 |
| CN | 201112305 Y | 9/2008 |

(Continued)

OTHER PUBLICATIONS

French Search Report and Written Opinion dated Sep. 21, 2021 for corresponding French Patent Application No. FR2100171, 10 pages.

*Primary Examiner* — Robert J Hoffberg
(74) *Attorney, Agent, or Firm* — Locke Lord LLP

(57) ABSTRACT

A locking device includes:
  a housing intended to be mounted on an electrical switchboard between a first switching apparatus and a second switching apparatus, each of the switching apparatuses having a control lever able to move between a lower position, corresponding to an open state, and an upper position, corresponding to a closed state,
  a locking member able to move in rotation between:
  a first locking position, in which the locking member blocks the control lever of the first switching apparatus in the open position, and
  a second locking position, in which the locking member blocks the control lever of the second switching apparatus in the open position.

18 Claims, 10 Drawing Sheets

(56) References Cited

U.S. PATENT DOCUMENTS

| | | | |
|---|---|---|---|
| 4,356,363 A | 10/1982 | Harbauer et al. | |
| 4,665,284 A * | 5/1987 | Guinan | H01H 9/26 200/50.33 |
| 4,924,041 A | 5/1990 | Yee | |
| 6,137,070 A * | 10/2000 | Montague | H01H 9/26 200/50.33 |
| 6,180,897 B1 * | 1/2001 | Montague | H01H 9/286 200/50.33 |
| 6,252,165 B1 * | 6/2001 | Montague | H01H 9/26 220/680 |
| 6,416,702 B1 * | 7/2002 | Montague | H01H 9/286 361/627 |
| 6,563,063 B1 * | 5/2003 | Moore | H01H 9/26 200/5 B |
| 8,138,433 B2 * | 3/2012 | Czarnecki | H01H 9/26 200/50.32 |
| 8,198,556 B2 * | 6/2012 | Majewski | H01H 9/283 200/43.15 |
| 8,552,318 B2 * | 10/2013 | Najera | H01H 9/26 200/50.35 |
| 8,803,369 B1 * | 8/2014 | Caudill | H02J 9/06 307/139 |
| 8,921,713 B2 * | 12/2014 | Eriksson | H01H 50/323 174/541 |
| 9,010,721 B2 * | 4/2015 | Hoots | F16K 35/06 70/180 |
| D834,534 S * | 11/2018 | Dominguez | D13/160 |
| 10,234,055 B2 * | 3/2019 | Bertrem | F16K 35/06 |
| D845,441 S * | 4/2019 | Bertrem | F16K 31/602 D23/249 |
| 10,629,390 B2 * | 4/2020 | Kuhn | H01H 19/64 |
| 11,450,490 B2 * | 9/2022 | Molitor | H01H 9/26 |
| 11,486,514 B2 * | 11/2022 | Hielkema | F16K 37/0041 |
| 2007/0289851 A1 | 12/2007 | McCoy | |
| 2019/0206636 A1 | 7/2019 | Kuhn | |
| 2021/0159030 A1 * | 5/2021 | Dominguez | H01H 9/28 |

FOREIGN PATENT DOCUMENTS

| | | | | |
|---|---|---|---|---|
| CN | 210223830 U | | 3/2020 | |
| CN | 110993399 A | * | 4/2020 | ............... H02J 9/06 |
| EP | 2073231 A1 | * | 6/2009 | ............... H01H 9/26 |
| FR | 3054925 A1 | | 2/2018 | |
| JP | H09153327 A | * | 6/1997 | ............ H01H 73/02 |
| JP | H10134693 A | * | 5/1998 | ............. H01H 9/281 |
| KR | 200392921 Y1 | * | 8/2005 | ............. H01H 71/52 |

* cited by examiner

LOCKING DEVICE FOR AN ELECTRICAL SWITCHBOARD

TECHNICAL FIELD

The present invention relates to a locking device for an electrical switchboard, and an electrical system comprising such a locking device.

The invention relates notably to the field of electricity distribution, preferably for low voltages (that is to say, electrical voltages lower than or equal to 1000 V AC or 1500 V DC).

BACKGROUND

In electricity distribution installations, notably in a domestic framework or in residential or commercial buildings, it is becoming increasingly commonplace to have several sources of electricity. For example, an installation of a client may be designed to be connected to an electricity distribution network, and to a local source of electricity, such as a generator set, or solar panels, or an electricity storage device.

In many cases, the sources of electricity are connected to an electrical switchboard upstream of the installation of the client. A connection device allows just one of these sources to be selected, which will then power the installation situated downstream.

It is important for both the sources of electricity not to be able to be connected simultaneously by the user, at risk of causing irreversible damage to the installation.

There are connection devices comprising a locking (or interlocking) system which guarantees that only one of the sources of electricity can be connected at a given instant.

However, these connection devices are often bulky, even complicated to manufacture and to install and to select. Also, how they are handled by the end user is not always simple, which can increase the risk of accidents.

SUMMARY

There is therefore a need for connection devices which are simple to use and which are of simplified design, while nevertheless being capable of guaranteeing the requisite safety.

To this end, a locking device for an electrical switchboard comprises:
  a housing intended to be mounted on an electrical switchboard between a first switching apparatus and a second switching apparatus, each of the switching apparatuses having a control lever able to move between a lower position corresponding to an open state and an upper position corresponding to a closed state,
  a locking member able to move in rotation about an axis of rotation essentially at right angles to a front face of the housing, the locking member comprising a blocking edge, a first contact edge and a second contact edge, the blocking edge being located between the first contact edge and the second contact edge,
  the locking member being able to move reversibly between:
    a first locking position, in which the locking member blocks the control lever of the first switching apparatus in the open position, by cooperation of the blocking edge with the control lever of the first switching apparatus, the second contact edge being aligned with the direction of movement of the control lever of the second switching apparatus to allow the movement of the control lever of the second switching apparatus to its closed position,
    a second locking position, in which the locking member blocks the control lever of the second switching apparatus in the open position, by cooperation of the blocking edge with the control lever of the second switching apparatus, the first contact edge being aligned with the direction of movement of the control lever of the first switching apparatus to allow the movement of the control lever of the first switching apparatus to its closed position.

By virtue of the invention, the locking device makes it possible to easily implement a safety locking function between two electrical switching apparatuses. In particular, the modular design of the locking device makes it possible to associate it easily with existing switching apparatuses, without needing to modify the architecture of these switching apparatuses. That contrasts with the known locking devices, which generally incorporate both the locking apparatuses and the locking function in a single apparatus, which is a solution that is more complex and less flexible.

Moreover, the locking device is particularly simple and intuitive to use for a user, without compromising the safety of operation, which is important for a device intended to be used in a domestic or commercial environment, by users who are not experts in electrical safety.

According to advantageous but not essential aspects, such a locking device can incorporate one or more of the following features, taken alone or in all technically admissible combinations:
  the locking member is also able to move into a third, intermediate locking position, between the first locking position and the second locking position, in which the first control lever and the second control lever are both held in the open position.
  the locking member comprises at least one orifice allowing the insertion of a locking tool, in order to keep the locking member blocked in at least one locking position.
  the locking member is in the form of a plate, notably triangular or essentially triangular or in the form of a butterfly, the blocking edge having a rounded form, or a faceted form, the contact edges each having a rectilinear form.
  the locking member comprises a gripping portion protruding with respect to a main face of the locking member.
  the locking device comprises at least one sensor configured to measure the position of the locking member.
  the sensor is a contact switch, the locking member comprises a fixing portion and the fixing portion comprises a cam which cooperates with a moving contact of the contact switch.
  the fixing portion is of tubular form which extends on the axis of rotation and which is received in a recess formed in the housing of the locking device.
  the locking device comprises two such sensors, disposed in a complementary manner in order to detect the movement of the locking member at least between the first position and the second position.
  the locking device is further configured to detect that the locking member is in a third position in which the first and second control levers are held in an open position.
  the recess receiving the fixing portion comprises a stiffener, such as a tongue made of plastic, which offers a resistance to the rotational movement of the locking member for a mid-point between the first position and the second position.

the housing of the locking device comprises an alignment and attachment system configured to cooperate with the respective housings of the first switching apparatus and of the second switching apparatus.

the lateral walls of the housing of the locking device comprise one or more centering blocks which protrude with respect to the lateral wall and which are intended to be received in corresponding receiving orifices formed on the lateral faces of the respective housings of the first switching apparatus and of the second switching apparatus.

the lateral walls of the housing of the locking device comprise fixing elements, such as hooks, configured to be attached to orifices or openings formed on the lateral faces of the respective housings of the first switching apparatus and of the second switching apparatus.

According to another aspect, the invention relates to an electrical system, comprising a locking device as described, a first switching apparatus and a second switching apparatus, the locking device being mounted on an electrical switchboard between the first switching apparatus and the second switching apparatus.

BRIEF DESCRIPTION OF THE DRAWINGS

The invention will be better understood and other advantages thereof will emerge more clearly in light of the following description of an embodiment of a locking device given purely by way of example and with reference to the attached drawings, in which.

DETAILED DESCRIPTION

Figure 1:
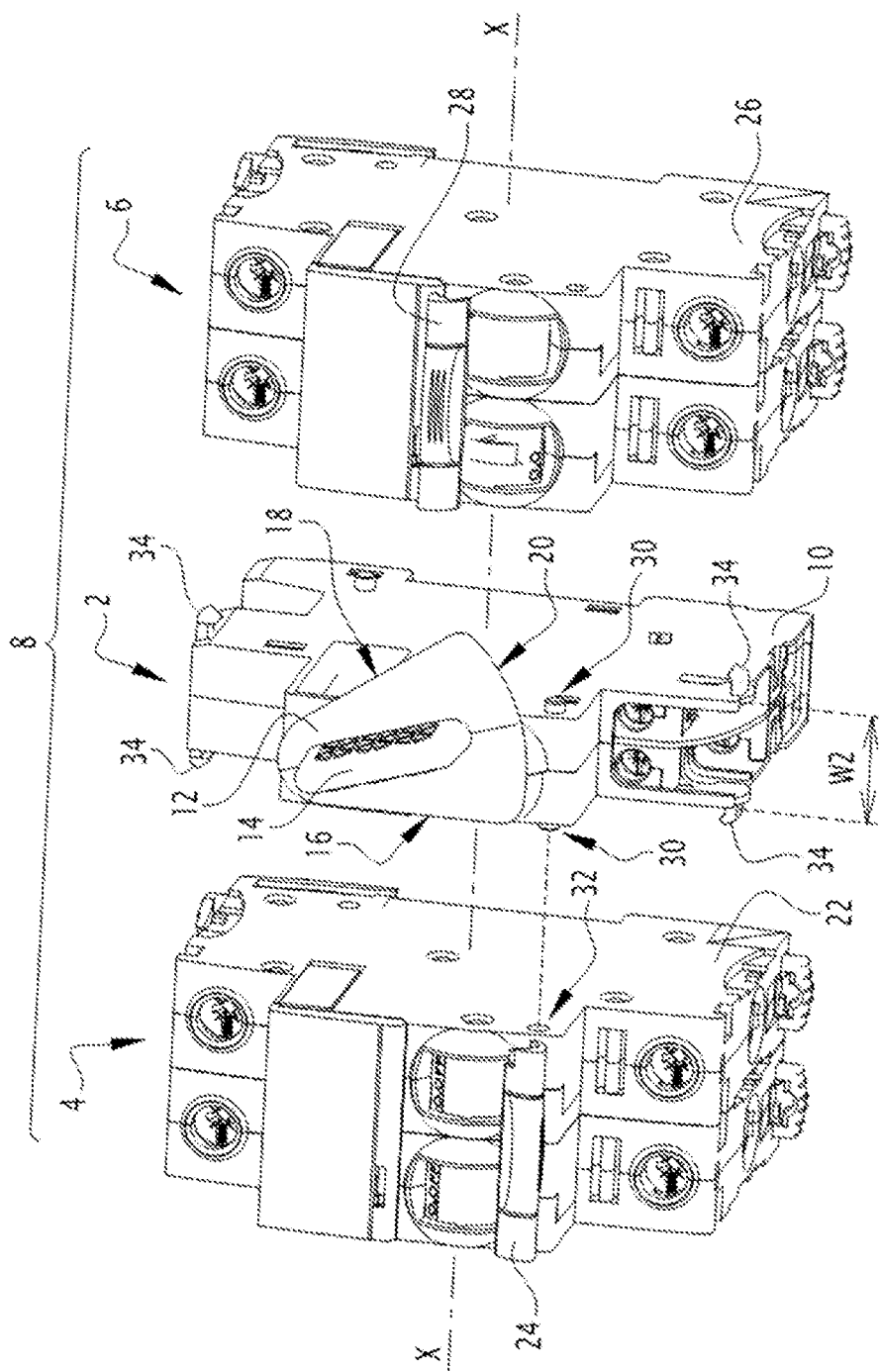
FIG. 1 schematically represents, by an exploded view, an electrical system comprising a locking device according to embodiments of the invention, the locking device being associated with a first switching apparatus and with a second switching apparatus.
Figure 2:
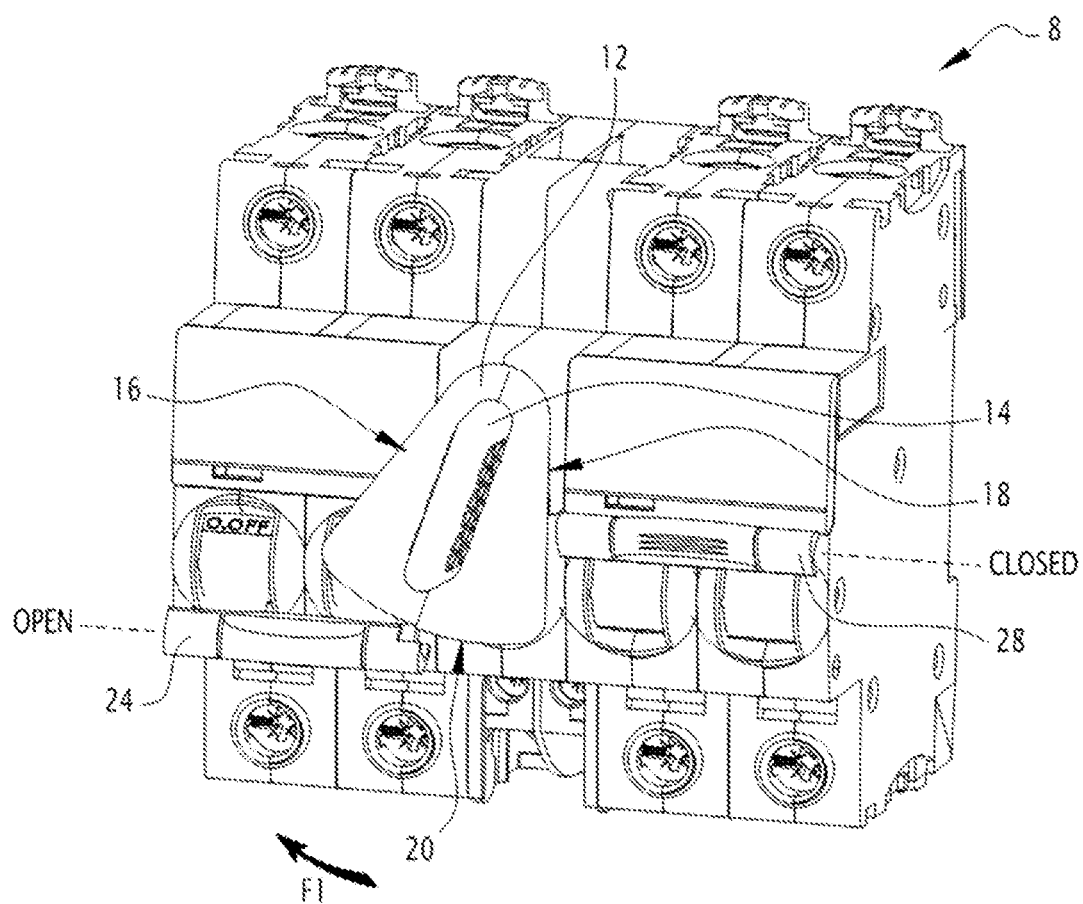
FIG. 2 schematically represents the electrical system of FIG. 1, in which a locking lever of the locking device is in a first locking position.
Figure 3:
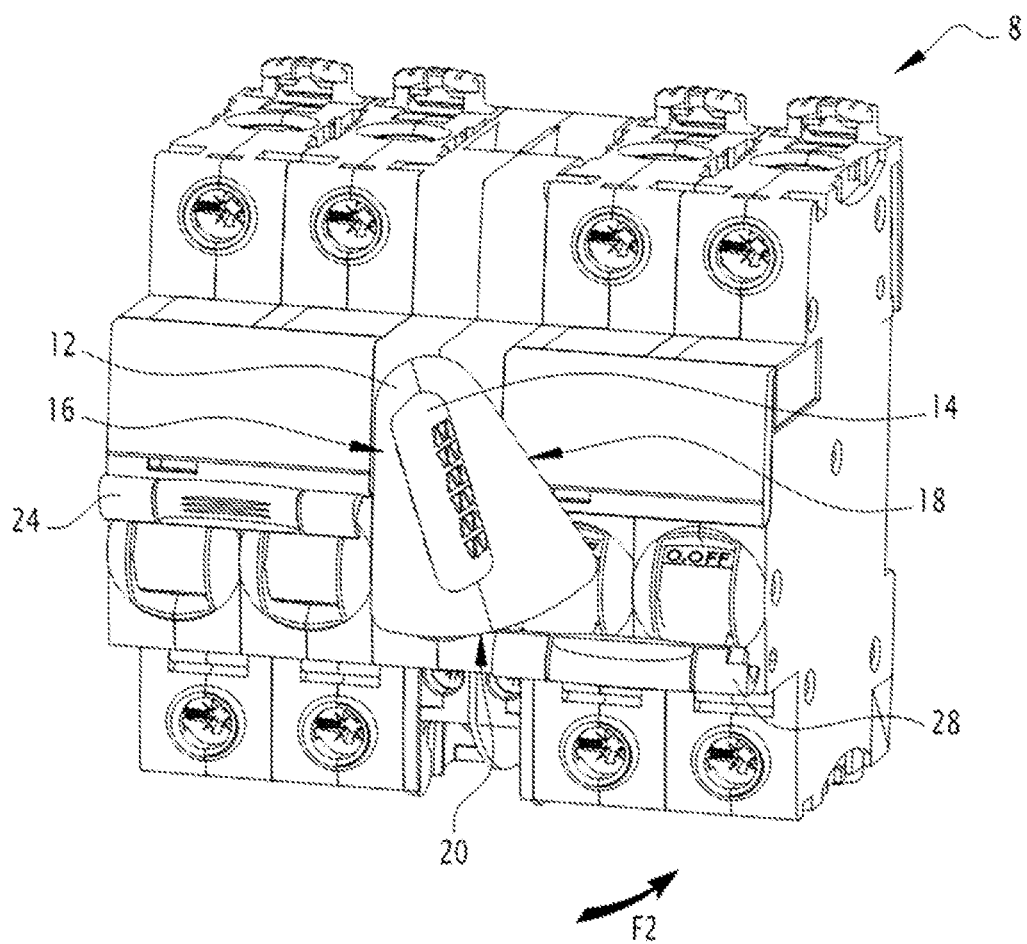
FIG. 3 schematically represents the electrical system of FIG. 1, in which the locking member of the locking device is in a second locking position.

FIGS. 1, 2 and 3 represent a locking device 2, for example intended to be mounted in an electrical switchboard between a first electrical switching apparatus 4 and a second electrical switching apparatus 6.

In practice, preferably, the locking device 2 and the switching apparatuses 4 and 6 are aligned along the same geometrical axis X when they are associated with one another.

For example, the locking device 2 and the switching apparatuses 4 and 6 can be mounted on a fixing rail, such as a fixing rail in the "DIN" standardized format. In FIG. 1, the direction of the fixing rail corresponds to the direction of the axis X.

According to one example, the first electrical switching apparatus 4 and a second electrical switching apparatus 6 are switches.

As a variant, the electrical switching apparatuses 4 and/or 6 could be circuit breakers. Preferably, the specifications of the switching apparatuses 4 and 6, such as the number of poles and/or the current ratings, are matched to the specifications of the electrical circuits situated upstream of the electrical system 8.

The first and second electrical switching apparatuses 4 and 6 are each able to switch between an electrically open state and an electrically closed state. Hereinbelow, the term "position" will be able to be used to refer to a state of a switching apparatus 4 or 6.

Each of the switching apparatuses 4, 6 has a control lever able to move between a lower position corresponding to the open state of the apparatus, and an upper position corresponding to the closed state of the apparatus.

For example, each of the control levers is able to move between its lower and upper positions by pivoting about a second axis of rotation parallel to the axis X.

Once associated, the locking device 2, the first electrical switching apparatus 4 and the second electrical switching apparatus 6 form an electrical system 8 that can be used to selectively connect one or other of two electrical sources upstream of an electrical installation.

The locking device 2 is notably configured to ensure a safety locking function, called interlocking, to ensure that only one of the switching apparatuses 4 or 6 is in a closed state at the same instant.

For this, the locking device 2 comprises:
- a housing 10 intended to be mounted on an electrical switchboard,
- a locking member 12, such as a locking lever or a rotary knob, able to move in rotation about an axis of rotation (denoted "Y" in FIG. 5) essentially at right angles, and preferably at right angles, to a front face of the housing.

The locking member 12 comprises a blocking edge 20, a first contact edge 16 and a second contact edge 18, the blocking edge being located between the first contact edge and the second contact edge.

For example, the first contact edge 16 and the second contact edge 18 converge towards an upper point of the locking member oriented towards the top of the locking device 2, whereas the blocking edge 20 is turned towards the bottom of the locking member 2.

For example, the locking member 12 is in the form of a plate. Preferably, the plate has a triangular or essentially triangular form or the form of a butterfly. Preferentially, the plate has a form which has a symmetry with respect to a plane of symmetry, which corresponds here to a median plane of the locking member 12. Notably, the first contact edge 16 is disposed symmetrically with respect to the second contact edge 18.

In the example illustrated, the locking member 12 comprises a gripping portion 14 protruding with respect to a main face of the locking member.

In the example illustrated, the blocking edge 20 has a rounded form, the contact edges 16 and 18 each having a rectilinear form.

The first switching apparatus 4 comprises a housing 22 and a control lever 24 as described previously.

The second switching apparatus 6 comprises a housing 26 and a control lever 28 as described previously.

Preferably, the control levers 24 and 28 are situated on front faces of the housings 22 and 26. Likewise, the locking member 12 is situated on a front face of the housing 10.

The locking member 12 is able to move reversibly between:
- a first locking position, in which the locking member 12 blocks the control lever 24 of the first switching apparatus 4 in the open position (i.e. in the lower position of the control lever), and
- a second locking position, in which the locking member 12 blocks the control lever 28 of the second switching apparatus 6 in the open position (i.e. in the lower position of the control lever).

In the first locking position, visible in FIG. 2, the locking member 12 blocks the control lever 24 of the first switching apparatus 4 in the open position ("OPEN") by cooperation of the blocking edge 20 with the control lever of the first switching apparatus, which acts as a stop against the control lever.

For example, this position is obtained by turning the locking member 12 in the direction of rotation represented by the arrow F1.

In this position, the second contact edge 18 is aligned with the direction of movement of the control lever 28 of the second switching apparatus 6 to allow the movement of the control lever of the second switching apparatus to its closed position ("CLOSED").

In the second locking position, visible in FIG. 3, the locking member 12 blocks the control lever 28 of the second switching apparatus 6 in the open position, by cooperation of the blocking edge with the control lever 28 of the second switching apparatus 6.

For example, this position is obtained by turning the locking member 12 in the direction of rotation represented by the arrow F2 (direction opposite to the arrow F1).

In this position, the first contact edge 16 is aligned with the direction of movement of the control lever 24 of the first switching apparatus 4 to allow the movement of the control lever 24 of the first switching apparatus 4 to its closed position.

Thus, the locking device 2 is particularly simple and intuitive to use for a user, without compromising safety of operation, which is important when the locking device 2 is used in a domestic or commercial environment, by users who are not experts in electrical safety.

Furthermore, the locking member 12 on the front panel provides a visual indication on the state of the installation, and shows immediately which of the two apparatuses is locked in the open state.

For example, the housing 10 is produced in a polymer material, such as a plastic material, notably moulded plastic.

The housing 10 can be assembled from two half-shells of complementary or symmetrical forms.

Preferably, the housing 10 has a width (denoted W2 in FIG. 1) less than 20 mm, for example equal to 18 mm, corresponding to a standardized width.

In practice, the form and the dimensions of the housing 10 are compatible with those of the housings 22 and 26 of the switching apparatuses 4 and 6. For example, the housings 10, 22 and 26 have the same height and the same depth.

Preferably, the housing 10 comprises an alignment and attachment system configured to cooperate with the respective housings of the first switching apparatus 4 and of the second switching apparatus 6.

As an example, the lateral walls of the housing 10 of the locking device 2 can comprise one or more centering blocks 30 which protrude with respect to the lateral wall and which are intended to be received in corresponding receiving orifices 32 formed on the lateral faces of the housings 22 and 26.

Optionally, the lateral walls of the housing 10 can also comprise fixing elements 34, such as hooks, intended to be attached to orifices or openings formed on the lateral faces of the housings 22 and 26.

In an assembled configuration of the electrical system 8, the centering blocks 30 are inserted into the orifices 32 of the housings 22 and 26.

Figure 4:
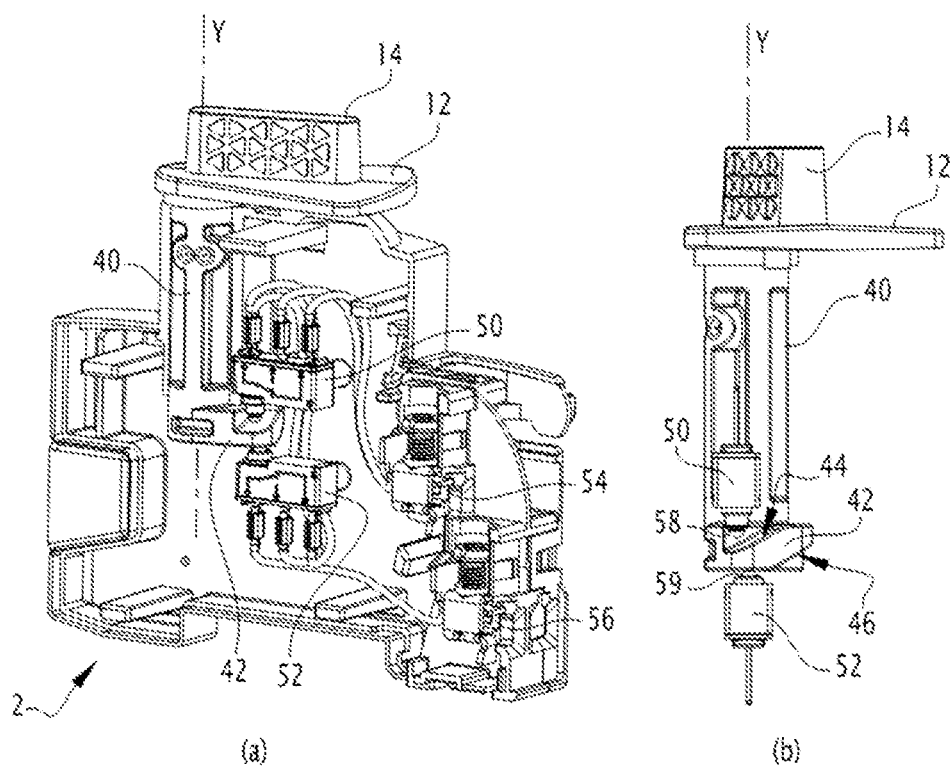
FIG. 4 schematically represents, on its inserts (a) and (b), two internal views of the locking device and of the locking member of FIG. 1.

The insert (a) of FIG. 4 represents an internal view of the locking device 2. For example, one of the half-shells of the housing 10 is removed in order to reveal the inside of the locking device 2.

The locking member 12 comprises a fixing portion 40 (also called guiding portion) of tubular form which extends on the axis of rotation of the locking member 12 (denoted "Y" in this figure).

The fixing portion 40 is, here, received in a recess formed in the housing of the locking device, notably in order to allow a pivot link allowing the rotation of the locking member 12 with respect to the housing 10.

For example, the fixing portion 40 is produced in a single piece with the locking member 12. The fixing portion 40 can thus be made of a plastic material, or of any appropriate material.

Advantageously, the locking device comprises at least one sensor configured to measure the position of the locking lever 12.

Preferably, the locking device 2 comprises two such sensors, here denoted 50 and 52, disposed in a complementary way to detect the movement of the locking member 12 at least between the first position and the second position. Preferably, the sensors 50 and 52 make it possible to detect a movement into the third position (intermediate position) notably to determine that the locking member is in a third position in which the first and second control levers 24, 28 are held in an open position.

For example, each sensor is a contact switch, comprising a moving contact serving as sensitive portion capable of detecting when an object presses on the moving contact.

Preferably, to detect the position and/or the movement of the locking member 12, the fixing portion 40 comprises a cam 42 which cooperates with the moving contact of the sensor or of each sensor 50, 52.

For example, the cam 42 extends protrudingly with respect to the fixing portion, in a radial direction at right angles to the axis of rotation Y. Preferably, the cam 42 is rigid. For example, the cam 42 is formed in the same material as the rest of the fixing portion 40.

Optionally, terminals 54 and 56 make it possible to connect the outputs of the sensors 50 and 52, in order to collect the measurement signals for them to be analysed by a data processing device (not illustrated).

The insert (b) of FIG. 4 represents an embodiment of the fixing portion 40 of the locking member 12, here illustrated aligned on the axis of rotation Y. This embodiment is used particularly in the case where the locking device 2 comprises two contact switches 50, 52 disposed as described above.

The cam 42 comprises a top inclined face 44 and a bottom inclined face 46, which preferably have the same angle of inclination with respect to the axis of rotation Y. In the example illustrated, the top inclined face 44 cooperates with the moving contact 58 of the first sensor 50, while the bottom inclined face 46 cooperates with the moving contact 59 of the second sensor 52.

The inclined faces 44 and 46 are oriented in such a way that, when the locking member 12 is rotated in one direction or in the other, one of the moving parts 58, 59 ceases to be in contact with the cam 42, while the other of the moving parts 58, 59 enters into contact with the cam 42. When the locking member 12 is in the first locking position or in the second locking position, only one or other of the moving parts 58 and 59 is in contact with the cam 42.

This disposition makes it possible to detect not only the position of the locking member 12, but also the direction of movement of the locking member 12, and makes it possible to more easily identify an anomaly, such as a failure of one of the sensors 50 or 52.

Figure 5:
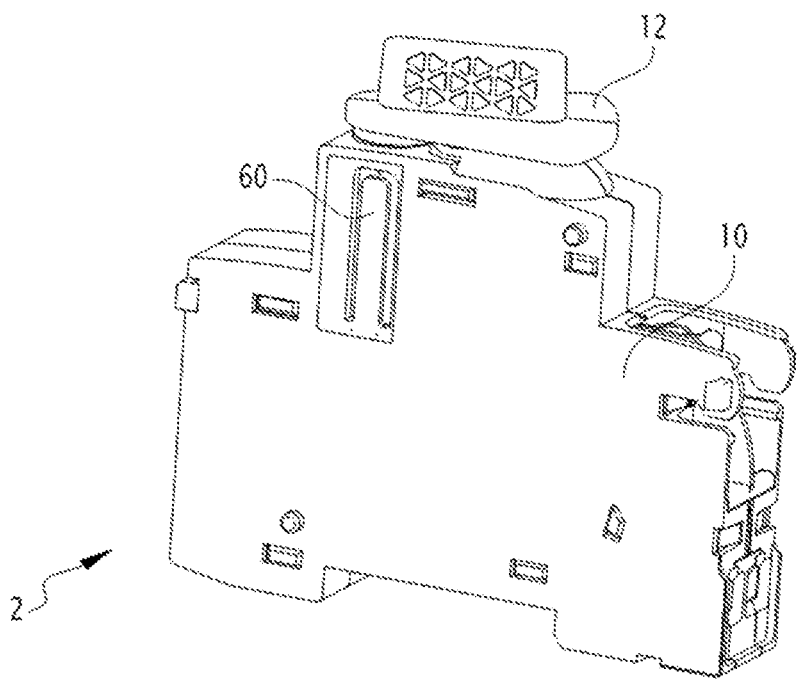
FIG. 5 schematically represents an external view of the housing of the locking device of FIG. 1, showing a stiffener cooperating with the locking member.

Preferentially but nevertheless optionally, as illustrated by FIG. 5, the recess of the locking device 2 receiving the fixing portion 40 comprises a stiffener 60, such as a tongue made of plastic. The stiffener 60 is configured to exert a resistance to the rotational movement of the locking member 12 for a mid-point between the first position and the second position when the locking member 12 is rotated about its axis of rotation Y.

That makes it possible to ensure a feedback that is perceptible to the user when he or she turns the locking member 12, for example by making the user feel a "hard point" when the locking member 12 crosses said mid-point.

For example, the tongue 60 is produced in a single piece with the wall of the housing 10.

Figure 6:
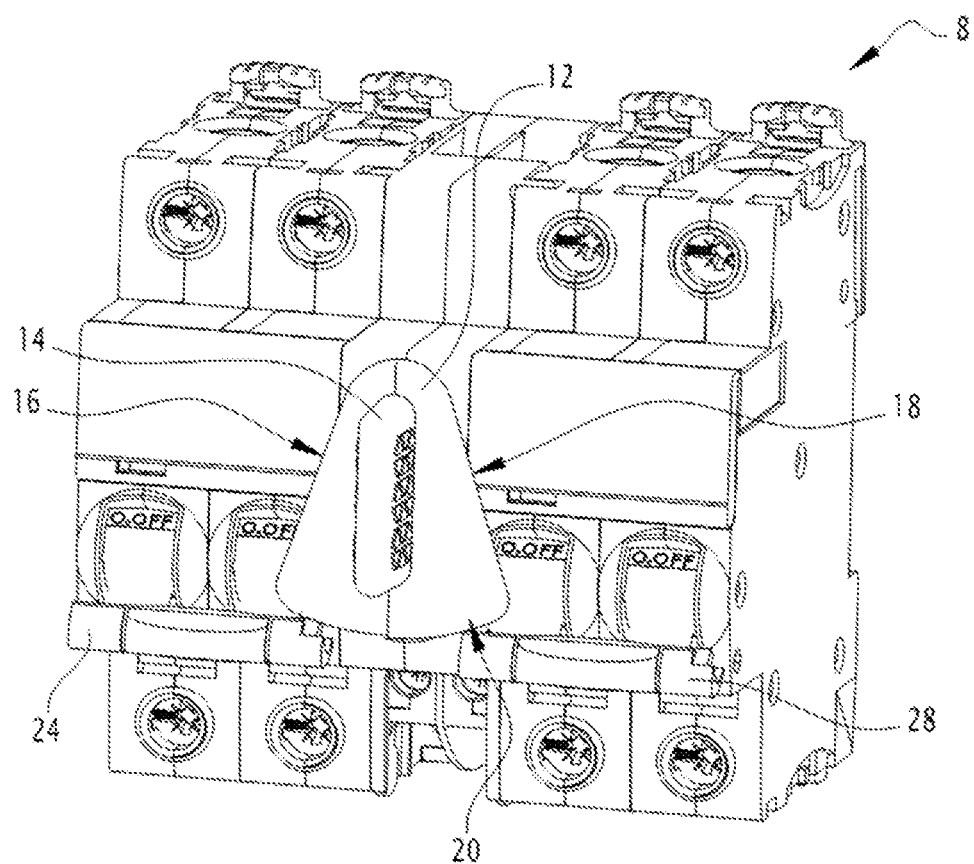
FIG. 6 schematically represents the electrical system of FIG. 1, in which the locking member of the locking device is in an intermediate position and in which the first switching apparatus and the second switching apparatus are locked out in an open state by the locking member.

Advantageously, as illustrated by FIG. 6, the locking member 12 is also able to move into a third, intermediate locking position between the first locking position and the second locking position.

In this third locking position, the first control lever 24 and the second control lever 28 are both held in the open position, for example, to carry out maintenance operations downstream.

For example, the locking member 12 can be oriented in an intermediate position which, in this example, corresponds to an alignment in a vertical direction when the locking device 2 is mounted with its front face mounted vertically, so that the ends of the blocking edge 20 form a stop preventing the control levers 24 and 28 from being raised to their upper position, which prevents the apparatuses 4 and 6 from switching to their closed state.

Thus, the two control levers 24 and 28 are blocked in the open position by the locking member 12, such that there is only very little mechanical play, even no mechanical play in the system.

That provides additional safety, and makes it possible to carry out maintenance of the installation downstream of the electrical system 8, by guaranteeing that the apparatuses 4 and 6 remain open, and therefore that the downstream-connected installation of the electrical system 2 cannot be electrically powered by the sources situated upstream.

Figure 7:
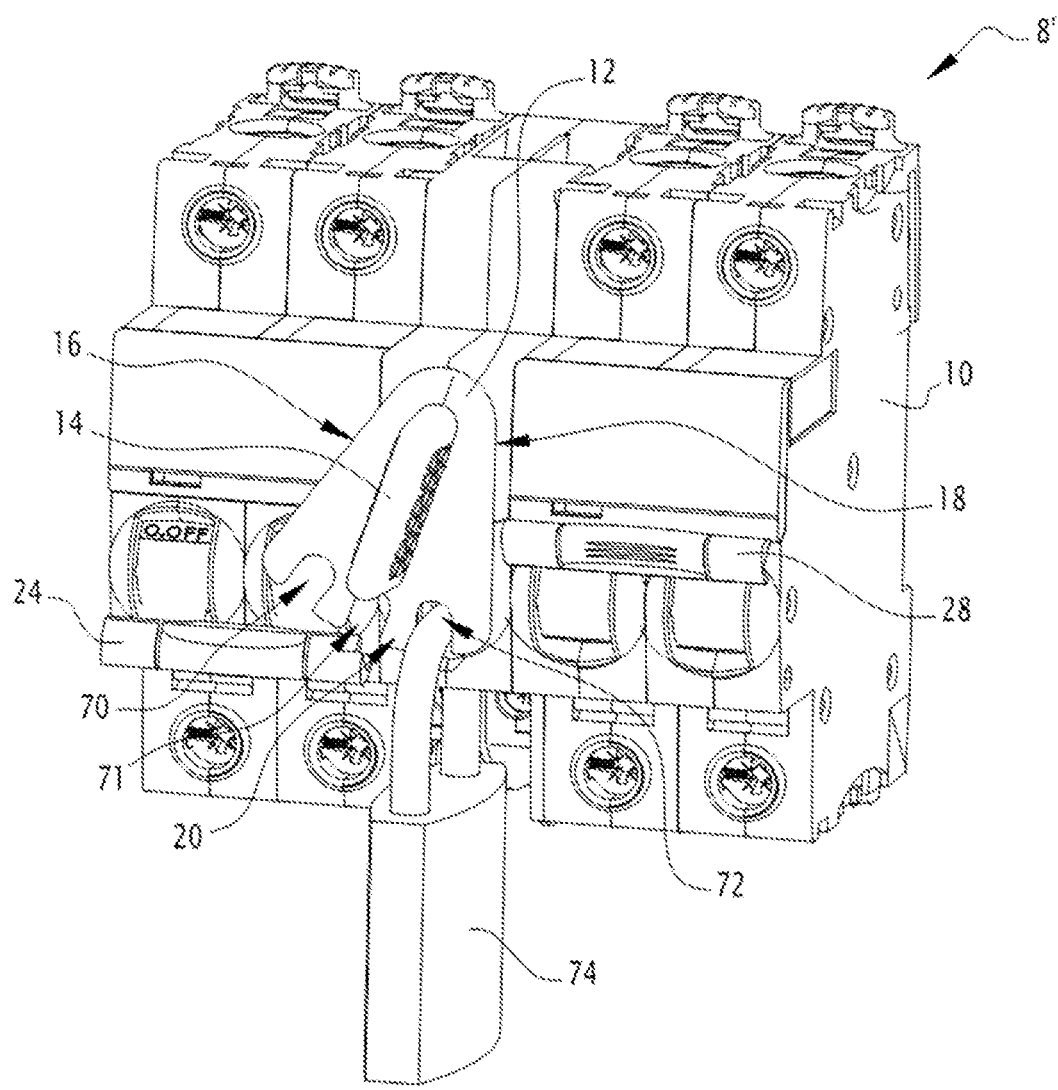
FIG. 7 schematically represents a variant of the electrical system, in which the locking member is coupled to a locking tool.
Figure 9:
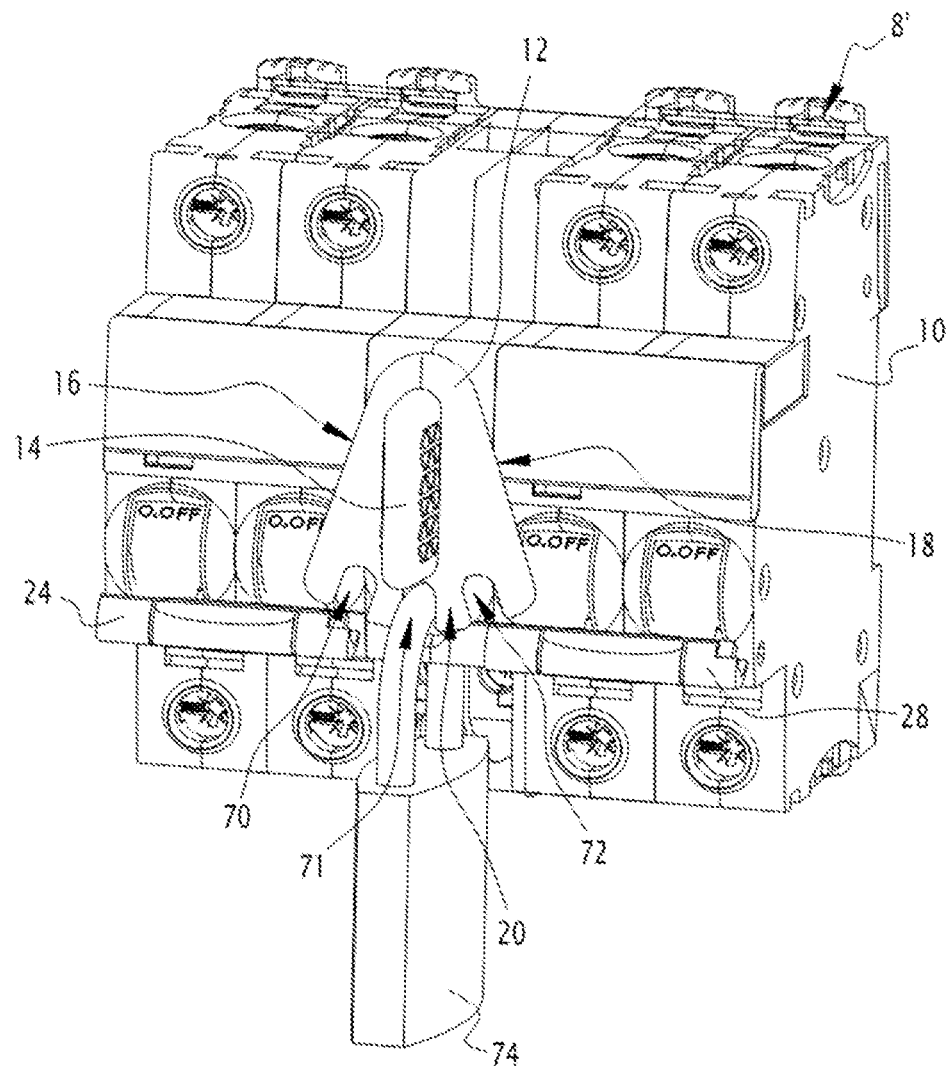
FIG. 9 schematically represents the variant of the electrical system of FIG. 7, illustrated in an intermediate position such as that illustrated in FIG. 6, and in which the locking member is coupled to a locking tool.
Figure 10:
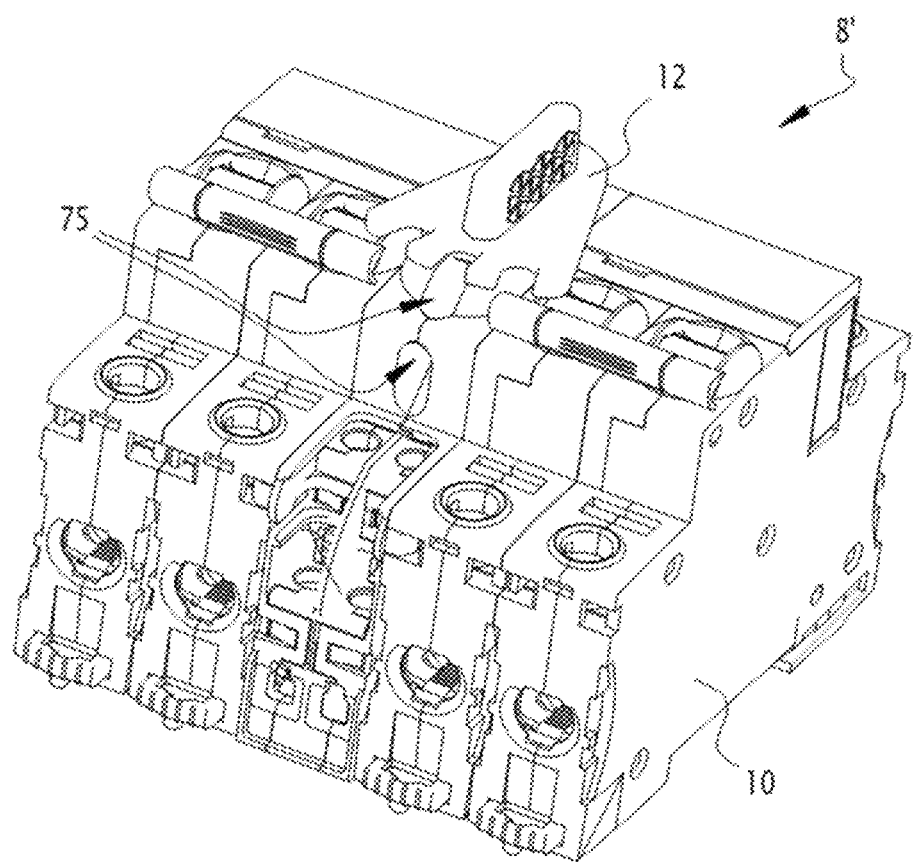
FIG. 10 schematically represents an orifice formed in the variant of the electrical system of FIGS. 6 and 9 for receiving the locking tool.

Optionally, as illustrated in the variant 8' visible in FIGS. 7, 9 and 10, the locking member 12 can comprise at least one orifice 70, 71, 72 (and preferably several orifices, notably three orifices) allowing the insertion of a locking tool 74, such as a padlock. These orifices 70, 71 and 72 are for example through-orifices which pass through the plate at right angles to the plane of the plate.

That makes it possible to keep the locking member 12 blocked in at least one locking position, and preferably in any one of the first, second and third locking positions (in the variants where the locking member 12 comprises three orifices 70, 71 and 72).

For example, to be able to keep the locking member 12 blocked in the first locking position, an orifice is formed in a part of the locking member situated on the side of the second contact edge 18.

Thus, when the locking member 12 is turned in the direction of the arrow F1, said orifice 72 is aligned vertically with a complementary orifice 75 formed in the housing of the locking device 2, as can be seen in FIG. 10, which allows the locking tool to block the rotation of the locking member. For example, when the locking tool is a padlock, the arch of the padlock is engaged in the two aligned orifices: the orifice 70, 71 or 72 of the locking member, and the complementary orifice 75.

As a variant, the complementary orifice 75 and/or the orifices 70, 71 and/or 72 could have a different form and/or a different arrangement. Also, although the complementary orifice 75 is, here, visible only on the variant 8' of FIG. 10, it is understood that this description can be transposed to the other variants of the locking device 2, and notably to those in which the orifice 71 is omitted.

A similar disposition can be provided for another orifice 70 with respect to the first contact edge 16 in order to block the control lever 12 in the second position. A third orifice 71 making it possible to block the control lever 12 in the intermediate position can be placed in the middle of the edge 20, for example between the two other orifices 70 and 72. This orifice 71 can however be omitted in some variants.

It will be noted that, in this figure, the elements of the variant 8' which bear the same reference symbols as the elements previously described are identical or similar to those elements. The description which has been made thereof can thus be transposed to the variant 8'.

If necessary, the housing 10 of the locking device 2 can also comprise one or more corresponding orifices for fixing said locking tool 74 and preventing it from moving when the locking member 12 is turned while the locking tool 74 is attached to it.

In the example illustrated, the orifices 70, 71, 72 are incisions formed in the locking member 12 from the blocking edge 20. This example is not limiting and other implementations are possible as variants.

Figure 8:
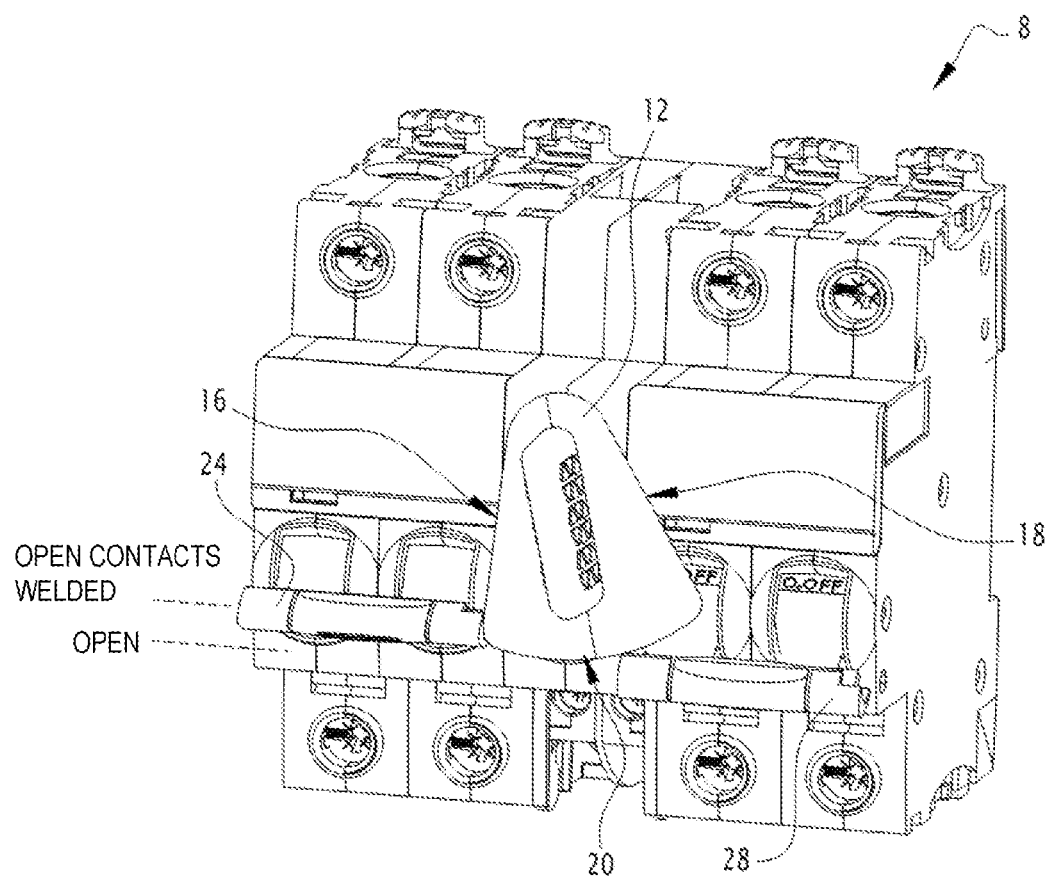
FIG. 8 schematically represents another state of the electrical system of FIG. 6, in which the locking member cannot be actuated because of the welding of the contacts of the first switching apparatus.

FIG. 8 illustrates an advantageous application of the locking device 2 when one of the switching apparatuses suffers an electrical failure and remains in an electrically closed state, for example following an accidental welding of the electrical contacts internal to that apparatus.

In such a case, as can be seen in the apparatus 4 of FIG. 8, the corresponding control member (here the control lever 24) is then in an intermediate position ("OPEN CONTACTS WELDED" position in FIG. 8), distinct from but nevertheless adjacent to the open position ("OPEN"). Notably, the intermediate position corresponds to a higher position of the lever than the open position.

However, by virtue of the dimensions of the locking member 12, the first contact edge 16 comes into abutment against the first control lever 24, which prevents any rotation of the locking member 12 to the first locking position and forces the locking member 12 to remain in the second locking position.

In other words, it is impossible to unlock the second apparatus 6, which is then forced to remain in an open state while the first apparatus 4 is in a fault state. That increases the safety of the system 8 and prevents the two apparatuses from being able to be simultaneously in a closed state; even in the event of accidental welding of the electrical contacts of one of these apparatuses.

It is understood that the example is not limiting and that the same operation can be obtained when it is the second apparatus 6 which suffers such a failure.

The embodiments and the variants envisaged above can be combined with one another to create new embodiments.

The invention claimed is:

1. A locking device for an electrical switchboard, comprising:
   a housing intended to be mounted on the electrical switchboard between a first switching apparatus and a second switching apparatus, each of the first and second switching apparatuses having a control lever able to move between a lower position corresponding to an open state and an upper position corresponding to a closed state;
   a locking member able to move in rotation around an axis of rotation essentially at right angles to a front face of the housing, the locking member comprising a blocking edge, a first contact edge and a second contact edge, the blocking edge being located between the first contact edge and the second contact edge,
   the locking member being able to move reversibly between:
      a first locking position, in which the locking member blocks the control lever of the first switching apparatus in its lower position, by cooperation of the blocking edge with the control lever of the first switching apparatus, the second contact edge being in-line with or substantially parallel to a direction of movement of the control lever of the second switching apparatus to allow a movement of the control lever of the second switching apparatus to its upper position,
      a second locking position, in which the locking member blocks the control lever of the second switching apparatus in its upper position, by cooperation of the blocking edge with the control lever of the second switching apparatus, the first contact edge being in-line with or substantially parallel to a direction of movement of the control lever of the first switching apparatus to allow a movement of the control lever of the first switching apparatus to its upper position,
   wherein the locking member is also able to move into a third, intermediate locking position between the first locking position and the second locking position, in which the control levers of the first and second switching apparatuses are both held in theft lower positions by the blocking edge, thereby preventing the control levers of the first and second switching apparatuses from being moved to theft upper positions.

2. The locking device according to claim 1, wherein the locking member comprises at least one orifice allowing an insertion of a locking tool, in order to keep the locking member blocked in at least one of the first, second and third locking positions.

3. The locking device according to claim 1, wherein the locking member is in the form of a plate, the blocking edge having a rounded form, the first and second contact edges each having a rectilinear form.

4. The locking device according to claim 3, wherein the form of the plate is triangular or essentially triangular.

5. The locking device according to claim 1, wherein the locking member comprises a gripping portion protruding with respect to a main face of the locking member.

6. The locking device according to claim 1, wherein the locking device comprises at least one sensor configured to measure a position of the locking member.

7. The locking device according to claim 6, wherein the at least one sensor is a contact switch, wherein the locking member comprises a fixing portion and wherein the fixing portion comprises a cam which cooperates with a moving contact of the contact switch.

8. The locking device according to claim 7, wherein the fixing portion is of tubular form which extends on the axis of rotation and which is received in a recess formed in the housing of the locking device.

9. The locking device according to claim 8, wherein the recess receiving the fixing portion comprises a stiffener, which offers a resistance to a rotational movement of the locking member for a mid-point between the first locking position and the second locking position.

10. The locking device according to claim 9, wherein the stiffener comprises a tongue made of plastic.

11. The locking device according to claim 6, wherein the at least one sensor of the locking device comprises two sensors each configured to measure a position of the locking member, disposed in a complementary manner in order to detect a movement of the locking member at least between the first locking position and the second locking position.

12. The locking device according to claim 11, wherein the locking device is further configured to detect that the locking member is in the third locking position.

13. The locking device according to claim 1, wherein the housing of the locking device comprises an alignment and attachment system configured to cooperate with a housing of each of the first switching apparatus and of the second switching apparatus.

14. The locking device according to claim 13, wherein the alignment and attachment system comprises one or more centering blocks which protrude with respect to lateral walls of the housing of the locking device and which are intended to be received in corresponding receiving orifices formed on a lateral face of the housing of each of the first switching apparatus and of the second switching apparatus.

15. The locking device according to claim 13, wherein the alignment and attachment system comprises fixing elements of the housing of the locking device configured to be attached to orifices or openings formed on a lateral face of the housing of each of the first switching apparatus and of the second switching apparatus.

16. The locking device according to claim 15, wherein the fixing elements comprise hooks.

17. The locking device according to claim 1, wherein the locking member is in the form of a butterfly, the blocking edge having a rounded form, the first and second contact edges each having a rectilinear form.

18. An electrical system, comprising the locking device according to claim 1, a first switching apparatus and a second switching apparatus, the locking device being mounted on an electrical switchboard between the first switching apparatus and the second switching apparatus.

\* \* \* \* \*